United States Patent [19]

Schaefer

[11] 4,218,824
[45] Aug. 26, 1980

[54] GUARD OPENING GAUGE

[76] Inventor: Deane R. Schaefer, 1847 N. Second Ave., Upland, Calif. 91786

[21] Appl. No.: 25,193

[22] Filed: Mar. 29, 1979

Related U.S. Application Data

[63] Continuation-in-part of Ser. No. 925,459, Jul. 17, 1978, abandoned.

[51] Int. Cl.² .............. G01B 3/46; G01B 5/18
[52] U.S. Cl. .................. 33/169 B; 33/178 B; 33/180 R
[58] Field of Search ........... 33/174 R, 178 R, 164 C, 33/180 R, 169 B, 178 B

[56] References Cited

U.S. PATENT DOCUMENTS

| 988,672 | 4/1911 | Stiriss | 33/169 B |
| 2,619,727 | 12/1952 | Krohn, Jr. | 33/169 B |
| 2,767,478 | 10/1956 | Adams | 33/178 B |

*Primary Examiner*—Willis Little
*Attorney, Agent, or Firm*—Poms, Smith, Lande & Rose

[57] ABSTRACT

A gauge for testing guards on machines against safety standards setting minimum clearances to moving parts as a relation of the openings in the guard. The gauge is in the form of a shaft having sized ends on either end thereof related to designated gauge opening sizes. Stop collars are positioned on the shaft at fixed lengths from the respective ends such that if the end passes through the opening the stop collar must contact the guard prior to the end touching any moving part within the guard in order for the guard to be in compliance. Additionally, the stop collars are sized to allow testing of additional openings to determine the size thereof. Thus, both the sized ends and the stop collars can be used to chuck opening sizes.

2 Claims, 4 Drawing Figures

GUARD OPENING GAUGE

BACKGROUND OF THE INVENTION

The present invention, which a continuation-in-part of Ser. No. 925,459, July 17, 1978 (now abandoned), relates to gauges for use in conjunction with machine guards and, more particularly, to gauges for testing the construction and installation of machine guards for compliance with industrial safety standards.

Industrial safety has become of increasing importance in recent years. Particularly with federal government standards such as OSHA and various similar statutes passed by the various states, standards for industrial safety which must be met are readily apparent. Where such standards are set, there must be an easy and straightforward way for both users and enforcers to test the installations to assure proper compliance with the applicable standards.

In particular, where guards are placed over moving parts of machinery, there are three variables which are specified. One is "clearance for moving parts at all points". The second is the "largest mesh or opening allowable". Finally, the standard sets the "minimum gauge (U.S. standard) or thickness" of the material employed. The standards for these three variables is a factor of the material employed. Referring briefly to FIGS. 3 and 4, the environment wherein the present invention is employed can be seen. These figures will be referred to later with reference to the invention itself. At this time, however, they are referred to merely to set forth the environment. As can be seen, a guard, generally indicated as 13, is used to cover a moving pulley 15 driving or driven by a V-belt 17. The guard 13 comprises an outer channel 21 of solid metal. The sides of the guard 13 are comprised of expanded metal 23 suitably attached to the outer channel 21 as by welding or the like. As can best be seen with reference to FIG. 4, the expanded metal 23 has a plurality of close adjacent spaced diamond-shaped openings 25 therein.

What is needed, is a gauge or test instrument by which opening size and/or the proper clearance from the guard 13 to the pulley 15 as a function of the size of the openings 25 can be ascertained. At present, there is no known easy and safe instrument for accomplishing these functions. Both users and enforcers are required to physically measure the opening sizes and distances with attendant possibilities for error (both intentional and accidental) as well as a high risk factor when rulers and the like are placed adjacent moving parts.

Wherefore, it is the object of the present invention, to provide a guard opening gauge of simple structure, which is inexpensive to manufacture, has no moving parts, requires no maintenance, eliminates the need for several measurement tools, may be produced by injection molding of metal or plastic, and which functions efficiently, effectively, reliably, safely, and accurately to provide exact measurements in determining whether or not machine guards are properly constructed.

DESCRIPTION OF THE PREFERRED EMBODIMENT

In the description which follows hereinafter, the sizes shown are for a tested embodiment constructed to test machine guards for compliance with specific standards. It is to be understood that the dimensions indicated are for the particular gauge constructed only and to comply with different regulations, different sizing would, of necessity, have to be employed.

Additionally, in the preferred embodiment as tested by the applicant, a tolerance level of 0.005 inches was established. This is, of course, much closer than it would be possible to measure the sizes and distances employing normal measuring devices. Thus, the present invention provides an accuracy of measurement and compliance not possible with conventional methods.

Figure 1:
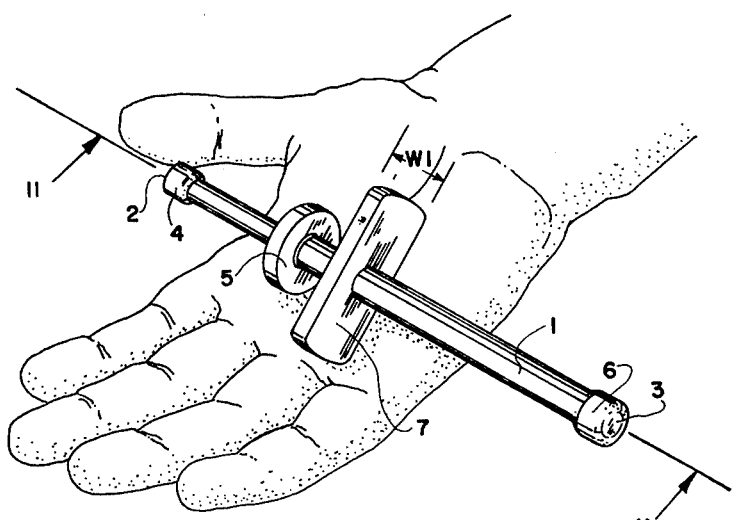
FIG. 1 is a perspective view of an embodiment of the guard opening gauge of the present invention.
Figure 2:
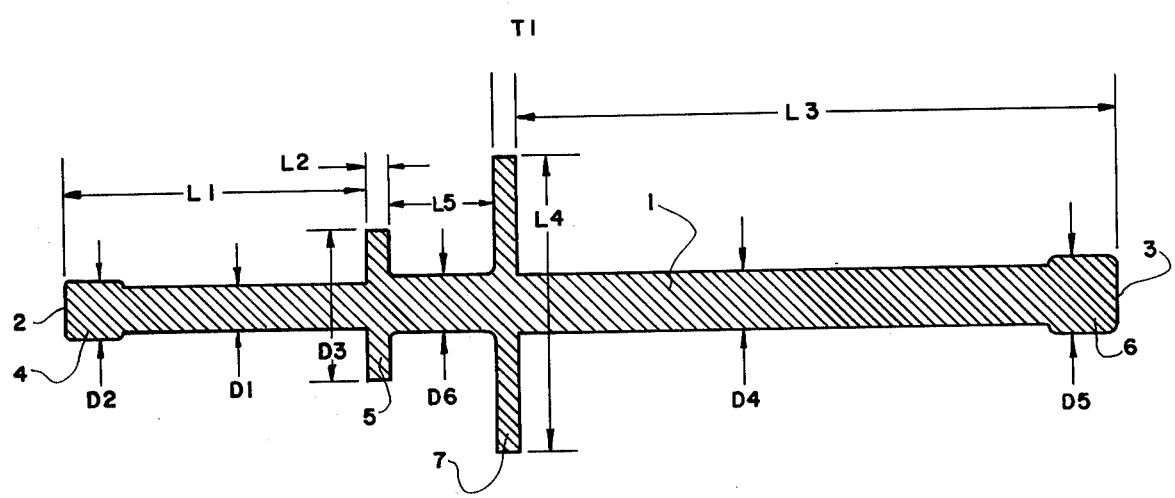
FIG. 2 is a sectional view, on an enlarged scale, taken along the line II—II of FIG. 1.

Referring now to FIG. 1 and FIG. 2, the guard opening gauge of the present invention in its preferred embodiment comprises a shaft 1 having spaced opposite first and second ends 2 and 3, respectively. The shaft 1 has a diameter D1 of 0.25 inches for the majority of the length L1 thereof of 1.995 inches from the first end 2, as shown in FIG. 2. A nub 4 having a diameter D2 of 0.3755 inches is provided at the first end 2. What is intended, is that if the nub 4 of diameter D2 will fit through the opening (for example diamond-shaped opening 25 of gauge 23 in FIGS. 3 and 4) the distance to any moving part must be greater than L1. Nub 4 can also be used alone to test for a 0.375 opening size where sufficient clearance distance can be clearly seen.

Figure 3:
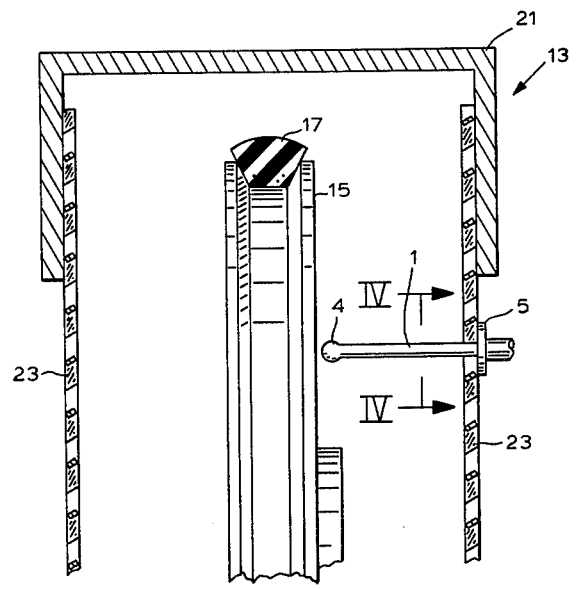
FIG. 3 is a partially cut-away view through a guard covering a V-belt pulley showing the present invention in its intended use.
Figure 4:
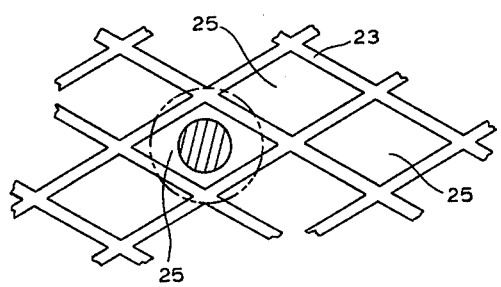
FIG. 4 is a cut-away view of the guard opening guage of the present invention as being employed in FIG. 3 taken along the line IV—IV of FIG. 3.

To test clearance as a function of opening size with the gauge, a disc 5 is provided 1.995 inches or the distance L1, from the first end 2 and has a thickness L2 of 0.125 inches and a diameter D3 of 1.005 inches as shown in FIG. 2. Thus, when inserted through the guard 13 as shown in FIG. 3, the disc 5 must stop the insertion of shaft 1 before first end 2 contacts a moving part. As can be seen in FIG. 3, in the position wherein the gauge is inserted as shown, the standard is apparently met. As can be seen further, however, by moving the gauge downwardly, end 2 would strike a portion of the pulley 15 prior to disc 5 contacting expanded metal 23 thus indicating a lack of compliance with the standards as embodied in the gauge.

While the nub 4 as shown comprises a generally cylindrical shape with rounded edges, a spherical nub is also desirable. Primarily, this shape prevents catching and pulling in the event that the nub 4 contacts a moving part. This is an inherent safety feature of the gauge of the present invention.

It should be noted that disc 5 can also be used as an opening gauge. In the particular example shown, being of a size of 1.005 inches, disc 5 can be used to check for 1" opening sizes with the indicated 0.005 inches of tolerance.

Returning once again to FIGS. 1 and 2 primarily, the shaft 1 has a diameter D4 of 0.375 inches for a distance L3 of 3.995 inches from the second end 3. A second nub 6 at the second end 3 with a diameter D5 of 0.5005 inches tests for 0.5 inch openings.

A substantially rectangular parallelepiped 7 has a length L4 of 2.005 inches, as shown in FIG. 2, and a width W1 of 1.0 inches, as shown in FIG. 1. The rectangular parallelepiped 7 has a thickness T1 of 0.125 inches, as shown in FIG. 2. The rectangular parallelepiped 7 is positioned 3.995 inches or the distance L3 from the second end 3. As should now be understood from the foregoing explanation, nub 6 can test the opening of the guard for 2 inch opening size. If there must be four inches (minus the 0.005 tolerance) of clearance to the moving part this can be tested as before described. The parallelepiped 7 is used in lieu of a disc such as disc 5. This is merely a matter of convenience inasmuch as a two-inch diameter disc would render the gauge of the present invention difficult to insert in one's pocket without inconvenience. By employing the shape shown, the stop collar function is still there and the two-inch length L4 of 2.005 inches can still be used to test for two-inch openings in the same manner that disc 5 could be employed to test for one-inch openings.

In the particular embodiment as tested, the rectangular parallelepiped 7 is spaced a distance L5 of 0.75 inches from the disc 5, as shown in FIG. 2 and each of the disc 5 and the parallelepiped 7 is perpendicular to the shaft. The shaft 1 has a diameter D6 of 0.375 inches between the disc 5 and the parallelepiped 7 as shown in FIG. 2. While not so sized for any particular reason, in some instances, the distance L5 could be employed in testing a clearance and would, therefore, be sized accordingly.

Wherefore, from the foregoing description, it should be apparent to those skilled in the art that the present gauge can be employed for a number of functions. First, the testing of clearance distances in relation to opening sizes with the two ends in conjunction with the disc 5 and parallelepiped 7 as described. Additionally, the nubs 4 and 6, the disc 5, and the parallelepiped 7 can be employed to test opening sizes. Moreover, by gripping the gauge at one end or the other, the gauge can be inserted in a narrow space to measure otherwise inaccessible clearances with the nubs 4 or 6 or, alternatively, with the disc 5 or the parallelepiped 7 both as to its length L4 and its width W1. Thus, it will be appreciated that the gauge of the present invention is a valuable instrument to be used easily and accurately in the construction, maintenance, and enforcement of safety standards with relation to guards covering moving parts in machinery.

Wherefore, having thus described my invention, I claim:

1. A unitary gauge for assuring compliance with pre-established safety requirements for guards for moving parts of machinery wherein each of a plurality of different pre-established maximum guard opening sizes has associated therewith a pre-established minimum distance from the guard to any moving part of the machinery associated therewith, said unitary gauge comprising:
   (a) a shaft;
   (b) a first nub on one end of said shaft being of circular cross-section normal to the longitudinal axis of said shaft and having a diameter equal to one of the pre-established maximum guard opening sizes;
   (c) a first stop plate disposed on said shaft and normal thereto at the pre-established minimum distance from said nub which is associated with said one of the pre-established maximum guard opening sizes, said first stop plate being a disc having a maximum diameter greater than said one of the pre-established maximum guard opening sizes equal to a second of the pre-established maximum guard opening sizes.

2. The unitary guard opening gauge of claim 1 and additionally comprising:
   (a) a second nub on the other end of said shaft being of circular cross-section normal to the longitudinal axis of said shaft and having a diameter equal to a third of the pre-established maximum guard opening sizes; and,
   (b) a second stop plate disposed on said shaft and normal thereto at the pre-established minimum distance from said second nub which is associated with said third of the pre-established maximum guard opening sizes, said second stop plate being at least a partial disc having a maximum diameter greater than said third of the pre-established maximum guard opening sizes and equal to a fourth of the pre-established maximum guard opening sizes.

* * * * *